US006560463B1

(12) United States Patent
Santhoff

(10) Patent No.: US 6,560,463 B1
(45) Date of Patent: May 6, 2003

(54) COMMUNICATION SYSTEM

(75) Inventor: John H. Santhoff, Panama City Beach, FL (US)

(73) Assignee: Pulse-Link, Inc., San Diego, CA (US)

(*) Notice: Subject to any disclaimer, the term of this patent is extended or adjusted under 35 U.S.C. 154(b) by 0 days.

(21) Appl. No.: 09/677,082

(22) Filed: Sep. 29, 2000

(51) Int. Cl.$^7$ ................................................ H04B 7/00
(52) U.S. Cl. .......................................... 455/522; 455/69
(58) Field of Search ................................. 455/424, 453, 455/456, 522, 67.1, 69, 70; 370/342

(56) References Cited

U.S. PATENT DOCUMENTS

| | | | |
|---|---|---|---|
| 3,668,639 A | 6/1972 | Harmuth | 340/166 R |
| 3,678,204 A | 7/1972 | Harmuth | 179/15 BC |
| 4,506,267 A | 3/1985 | Harmuth | 343/744 |
| 4,641,317 A | 2/1987 | Fullerton | 375/1 |
| 4,651,152 A | 3/1987 | Harmuth | 342/13 |
| 4,743,906 A | 5/1988 | Fullerton | 342/27 |
| 4,813,057 A | 3/1989 | Fullerton | 375/37 |
| 4,979,186 A | 12/1990 | Fullerton | 375/23 |
| 5,134,408 A | 7/1992 | Harmuth | 342/21 |
| 5,148,174 A | 9/1992 | Harmuth | 342/21 |
| 5,153,595 A | 10/1992 | Harmuth | 342/22 |
| 5,159,343 A | 10/1992 | Harmuth | 342/22 |
| 5,307,081 A | 4/1994 | Harmuth | 343/842 |
| 5,363,108 A | 11/1994 | Fullerton | 342/27 |
| 5,365,240 A | 11/1994 | Harmuth | 343/701 |
| 5,450,616 A * | 9/1995 | Rom | 455/69 |
| 5,493,691 A | 2/1996 | Barrett | 455/20 |
| 5,523,758 A | 6/1996 | Harmuth | 342/22 |
| 5,553,316 A * | 9/1996 | Diepstraten et al. | 370/445 |
| 5,586,145 A | 12/1996 | Morgan et al. | 375/239 |
| 5,592,177 A | 1/1997 | Barrett | 342/361 |
| 5,610,907 A | 3/1997 | Barrett | 370/342 |
| 5,677,927 A | 10/1997 | Fullerton et al. | 375/200 |
| 5,687,169 A | 11/1997 | Fullerton | 370/324 |
| 5,732,077 A * | 3/1998 | Whitehead | 370/349 |
| 5,768,684 A * | 6/1998 | Grubb et al. | 455/13.4 |
| 5,901,172 A | 5/1999 | Fontana et al. | 375/200 |
| 6,002,922 A * | 12/1999 | Schwent | 455/115 |
| 6,018,650 A * | 1/2000 | Petsko et al. | 455/232.1 |
| 6,031,862 A | 2/2000 | Fullerton et al. | 375/200 |
| 6,128,500 A * | 10/2000 | Raghavan et al. | 455/453 |
| 6,198,937 B1 * | 3/2001 | DeClerck et al. | 455/426 |

* cited by examiner

Primary Examiner—Quochien Vuong
(74) Attorney, Agent, or Firm—Luce, Forward, Hamilton & Scripps LLP

(57) ABSTRACT

The ultra-wideband communication system includes a transceiver configured to receive an ultra-wideband communication signal, which has embedded power level data. A measurement circuit in the transceiver measures the strength of the received signal. An attenuation factor is computed that compares the measured signal strength to the data embedded in the signal. A feedback circuit uses the attenuation factor to select a power level for a next transmission. In a preferred configuration, the transceiver also has a positioning circuit that is used to accurately determine the distance from the transceiver to the source of the communication signal, and the feedback circuit uses the distance to tune the power level for the next transmission. In another preferred configuration, a bit error rate is used to set power level for the next transmission.

10 Claims, 5 Drawing Sheets

COMMUNICATION SYSTEM

FIELD OF THE INVENTION

The field of the present invention is wireless communication systems. More particularly, the present invention relates to dynamic RF power management for use with an ultra-wideband communication system.

BACKGROUND OF THE INVENTION

Wireless communication systems are changing the way people work, entertain themselves, and communicate with each other. For example, the wide acceptance of mobile devices, such as the portable phone, has enabled great mobility while enabling easy voice and data communication with family, friends, and co-workers. As more features are added to these mobile wireless devices, users are able to receive a wider variety of information to facilitate enhanced entertainment and to more efficiently solve business problems. Data, such as computer files, graphics, video, and music may now be sent from a remote location and received at mobile wireless devices. Such wide area uses generally require a series of fixed transceivers arranged to communicate with the mobile wireless devices. In such a manner, the wireless device is enabled to communicate so long as the wireless device remains in contact with at least one of the fixed transceivers.

Not only is the use of such wide area systems expanding, but the use of local wireless communication systems is also growing. For example, wireless devices in a single building, such as a residence, may be configured to share information. Such local wireless communication systems may enable computers to control peripherals without physical connections, stereo components to communicate, and almost any appliance to have access to the Internet to send and receive information.

The amount of data being sent on both wide and local communication systems is mushrooming, and may quickly exceed the bandwidth available in the traditional communication bands. It has been recognized that a relatively new communication technology, "ultra-wideband" may provide assistance in meeting the ever increasing bandwidth demands. For example, U.S. Pat. No. 6,031,862, entitled "Ultra-wideband Communication System and Method", discloses a communication system using an impulse radio system. Impulse radio is a form of ultra-wideband communication using individually pulsed monocycles emitted at fractions of nanosecond intervals to transmit a digital signal. The pulses are transmitted at extremely low power density levels, for example, at less than −30 db to −60 dB. The generated pulses are so small that they typically exist in the noise floor of other more traditional communication systems.

An ultra-wideband communication system enables communication at a very high data rate, such as 100 megabit per second or greater, when operated in a small local area. However, since the ultra-wideband communication system needs to avoid interfering with the more established communication frequencies, the ultra-wideband system must operate at extremely low power, typically transmitting signals at the noise level. Accordingly, each ultra-wideband cell is severely restricted in size as compared to the more traditional continuous wave or carrier based systems.

Since each cell is so small in an ultra-wideband communication system, the system must have many fixed antenna sites to cover a geographic area. With so many antennae operating simultaneously, mobile transceivers are likely to be receiving communication signals from several transmitters including transmitters in adjacent cells and transmitters in more distant cells. With every cell potentially receiving signals from so many transmitters, communication channels must be geographically separated to minimize the occurrence of channel interference. For example, if a particular channel is used in cell, that channel may not be usable in any other cell within several miles. Accordingly, since only a relatively small subset of communication channels is available in each cell, the bandwidth of the overall communication system is substantially reduced.

Also, wireless communication systems suffer from a "near-far" problem, where a near transmitter's signal can overpower and saturate a receiver while a far transmitter's signal may be too weak to be reliably received. Since an ultra-wideband communication system has so many antenna sites, the severity of the near-far problem is exacerbated.

In any known conventional cell, utilized bandwidth varies as a function of user demand. Since user demand can vary greatly from one time period to another, there are likely to be times when a particular cell is greatly under-utilized, and other times when that same cell is saturated, thereby causing undesirable drops in transmissions, connection refusals, and quality degradation. In conventional communication signals, when a cell's bandwidth utilization exceeds system quality standards, the system operator typically will add another cell in the area to move some of the user traffic from the over-utilized cell to the new cell. However, adding cells and antennas can be a costly and time consuming process.

Although ultra-wideband has the ability to greatly decrease the impact of multipath interference, it is still subject to attenuation of the received signal as it traverses the distance between transmitter and receiver. For a point RF source, received signal strength varies as the inverse of the squared distance for open line of sight communications. In cluttered and mobile environments, the attenuation is more closely proportional to the inverse of the fourth power of the distance due to multipath cancellation, which is still present even in ultra-wideband signals. In either scenario, the attenuation of the signal can decrease the signal level to a value that is unsuitable for reliable data transfer. Due in part to the deficiencies described above, convention known ultra-wideband communication systems do not enable efficient utilization of bandwidth and system resources.

SUMMARY OF THE INVENTION

It is an object of the present invention to provide an ultra-wideband communications system that enables greater system efficiency and increases bandwidth utilization. To meet the stated objective, and to overcome the disadvantages in known communication systems, an ultra-wideband communication system is disclosed.

Briefly, the ultra-wideband communication system includes a transceiver configured to receive an ultra-wideband communication signal, which has embedded power level data. A measurement circuit in the transceiver measures the strength of the received signal. An attenuation factor is computed that compares the measured signal strength to the data embedded in the signal. An adaptive circuit uses the attenuation factor to select a power level for a next transmission. In a preferred configuration, the transceiver also has a positioning circuit that is used to accurately determine the distance from the transceiver to the source of the communication signal, and the adaptive circuit uses the distance to tune the power level for the next transmission.

Advantageously, the ultra-wideband communication signal enables accurate selection of power levels to optimize the efficiency of the communication system. More particularly, the accurate selection of the lowest acceptable power level minimizes interference between communication cells, thereby increasing reliability and optimizing bandwidth utilization.

These and other features and advantages of the present invention will be appreciated from review of the following detailed description of the invention, along with the accompanying figures in which like reference numerals refer to like parts throughout.

DETAILED DESCRIPTION OF THE INVENTION

Figure 1:
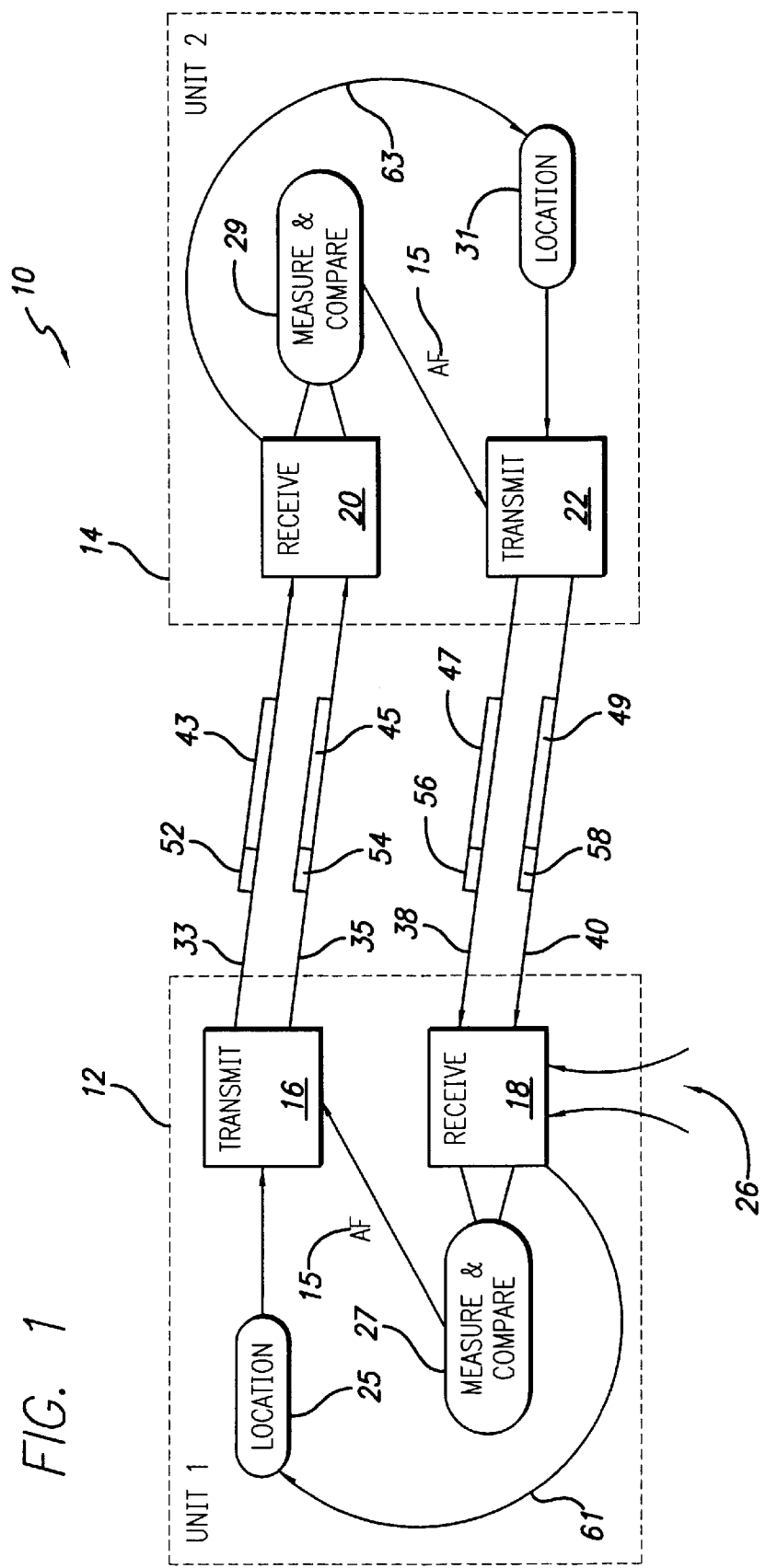
FIG. 1 is a block diagram of an ultra-wideband communication system in accordance with the present invention.

Referring now to FIG. 1, an ultra-wideband communication system 10 in accordance with the present invention is illustrated. The ultra-wideband communication system 10 generally comprises a plurality of ultra-wide transceivers configured to transmit and receive ultra-wideband communication signals. The communication system 10 employs a method of adjusting the power level of transmitted communication signals to reduce transmission power levels to the lowest acceptable level. In a particular example, the power level is first roughly selected to be at one of a limited number of values, and then fine-tuned to a more optimal level.

Since preferably the power level is continually monitored and adjusted, the entire communication system 10 operates with an efficiency and bandwidth availability not achieved in known conventional communication systems. For example, by reducing transmit power levels, greater channel re-use is permitted, with a corresponding increase in available system bandwidth. Further, since signal strength at a particular receiver is more uniform, the undesirable effects of the near-far problem are reduced.

FIG. 1 illustrates a transceiver unit 12 and a transceiver unit 14. In the illustration, transceiver units 12 and 14 are similar; however, it will be appreciated that the transceiver units may be alternatively constructed. The transceiver units are constructed to be positioned in a wireless ultra-wideband communication device such as a mobile phone, mobile internet device, portable radio, personal data assistant, or a fixed antenna cell site, for example.

Transceiver unit 12 includes a transmit circuit 16. The transmit circuit 16 is constructed to generate an ultra-wideband communication signal such as signal 33. The transmit circuit 16 generates signal 33 at a selectable power level. For example, the signal may be set to one of a discrete number of power levels. To facilitate selecting the lowest acceptable power level for future transmissions, information regarding the selected power level is embedded in the signal 33. In a preferred embodiment, the signal 33 transmits digital data communication information, which may be packetized according to known techniques. Accordingly, the power level set for transmitting signal 33 is communicated via power factor 52. One or more data packets, such as data packet 43, may contain the power factor 52 in the data packet 43 header information, for example. In a most preferred embodiment, the power factor 52 is a six bit representation of the power level used to transmit signal 33. Accordingly, the signal 33 can be transmitted at one of sixty-four selectable power levels.

Signal 33 is received by a receiver, such as ultra-wideband receiver 20 in transceiver 14. Receiver unit 20 is coupled to measure and compared circuitry 29, which measures the strength of the received signal 33. For example, the measure and compare circuit 29 may measure the peak voltage on the received signal. It will be appreciated that several alternatives exist for measuring the strength of the received signal 33.

The receive circuit 20 and the measure and compare circuit 29 also cooperate to decode the power factor 52 from the data packet 43, and compare the measured strength of signal 33 against the decoded power factor 52, which represents the power at which signal 33 was initially transmitted. Using the decoded power factor 52 and the measured signal strength of the received signal, an attenuation factor 15 is calculated. Attenuation factor 15 is fed back into transmit circuit 22, where the attenuation factor is used to select a power level to transmit signal 38. Accordingly, adaptive power regulation is provided. For example, if the attenuation factor 15 indicates that the received signal is stronger than necessary for reliable communication, then the transmit circuit 22 can select a substantially lower power level to transmit signal 38. However, if the attenuation factor shows such a high attenuation that the signal is barely discernable, then the transmit circuit 22 can adjust the power of signal 38 to a higher level. The power level selected by transmit circuit 22 is encoded into power factor 56 in data packet 47 which is communicated to receiver circuit 18.

As described above with reference to receiver 20, receiver 18 accepts signal 38 and uses measure and compare circuitry 27 to determine an attenuation factor 15. Attenuation factor 15 is fed back into transmit circuit 16 for selecting the power level for signal 35. As described above, the power factor selected for signal 35 is embedded as power factor 54 into data packet 45, which is then transmitted back to receiver 20. This iterative process continues with each new attenuation factor 15 being fed back into transmit circuit 22, which then selects the power level for signal 40, with the power level of signal 40 embedded in data packet 49 as power factor 58. Accordingly, with only a few communication iterations, the lowest selectable power level having acceptable attenuation is used for establishing the communication link between two transceivers.

However, the selected power is selected to be at, for example, one of sixty-four selectable power levels. It is preferable that the transmit power level be more accurately set to assure the lowest practical power level is selected for transmission. Accordingly, transceiver units 12 and 14 include location circuits 25 and 31, respectively, which are used to accurately determine the geographical position of each of the transceiver units.

It is a well known feature of ultra-wideband communication systems that highly accurate geographical positional information is discernable from signals received from at least three ultra-wideband transmitters having known geographical position. Typically, the transceiver having an unknown location receives ultra-wideband signals from three fixed ultra-wideband transmitters, with the signals sent from each transmitter embedding the geographical position of each respective transmitter. Using the known position of each fixed transmitter, and measuring the slight timing variations between received signals, the device with an unknown geographical location can triangulate and accurately determine its geographical position. Using such triangulation procedures, an ultra-wideband device can determine its geographical position to within a few centimeters, for example.

The location circuitry, such as location circuitry 25, receives signal 38 from transceiver 14, which may be a fixed site having a known geographical location, and from signals 26 from at least two other fixed ultra-wideband transmitters (not shown). The location circuitry 25 uses the timing relationships and location information in these signals 38 and 26 to accurately determine a location for the transceiver unit 12. With the exact location of the transceiver unit known, and the location of the fixed transmitters known, the location circuitry 25 and 31 can precisely determine the distance from the transceiver to the fixed transmitter. This distance information is also fed back to the transmit circuit 16. The distance information is then used to more accurately adjust the level of power the transmit circuit 16 uses to transmit the next signal.

It will be appreciated that although FIG. 1 shows a communication system 10 with communication established between two transceivers, that such communication may also be established between a mobile transceiver and a fixed transceiver unit. It will also be appreciated that the preferred embodiment initially uses 32 different selectable power levels to transmit each signal, but other numbers of selectable power levels may be used.

Figure 2:
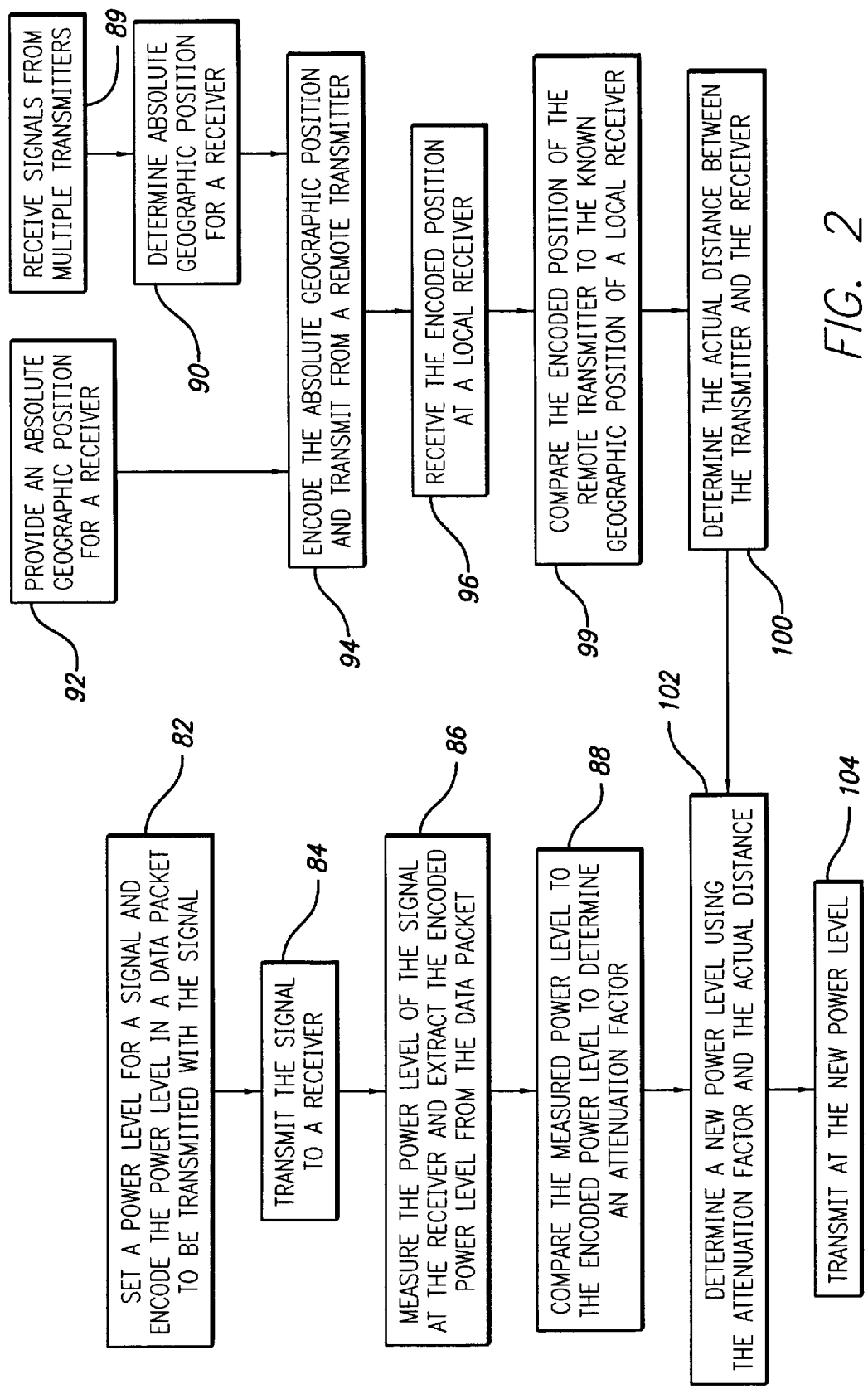
FIG. 2 is a flowchart of a method of using an ultra-wideband communication system in accordance with the present invention.

Referring now to FIG. 2, a method 80 of using an ultra-wideband communication system is described. Method 80 initially sets a power level for a signal and encodes that power level in a data packet to be transmitted with the signal as shown in block 82. The signal having the encoded power level is transmitted to a receiver in block 84. Block 86 shows that the receiver measures the power level of the signal and extracts the encoded power level from the data packet. The measured power level is compared to the encoded power level and an attenuation factor is calculated in block 88.

The attenuation factor is used to determine a new power level as shown in block 102. The attenuation factor may also be used to generally calculate a distance from the source of the transmitted signal to the receiver of the signal. This estimated distance may be used in a later calculation to more carefully tune the power level. With the new power level determined, the next signal is transmitted at the new selected power level as shown in block 104.

In a preferred embodiment, the receiver also receives signals from multiple transmitters, such as three fixed transmitters as shown in block 89. Using the signals' timing relationship and embedded positional information, an absolute geographic position for the remote device is determined as shown in block 90. Alternatively, an absolute geographical position can be assigned to a fixed receiver as shown in block 92. The geographical position of the fixed transmitter is communicated to the receiver as shown in blocks 94 and 96. Preferably, the position is encoded in a data packet which is communicated on the ultra-wideband signal sent from the transmitter to the receiver. Since the receiver now knows its absolute position and has received encoded information regarding the location of the transmitter, in block 98 the two geographical locations can be compared. After comparing the two positions, the actual distance between the transmitter and receiver can be determined in block 100. The actual distance is then used to determine a more tuned power level as shown in block 102. The more finely tuned power level can then be used to transmit the next signal using a new power level as shown in block 104.

In providing the optimal power level setting, the power level is first set to one of a set number of available power levels using an iterative communication process. Subsequent to selecting a power level, the actual distance between the transmitter and the receiver is used in a calculation to more precisely set the power level. It will be appreciated that the relationship between distance and transmission power is well known. Accordingly, the method of FIG. 2 enables the power level to be precisely minimized to maximize system-wide bandwidth, while still assuring reliable communication and reducing undesirable near-far effects.

Figure 3:
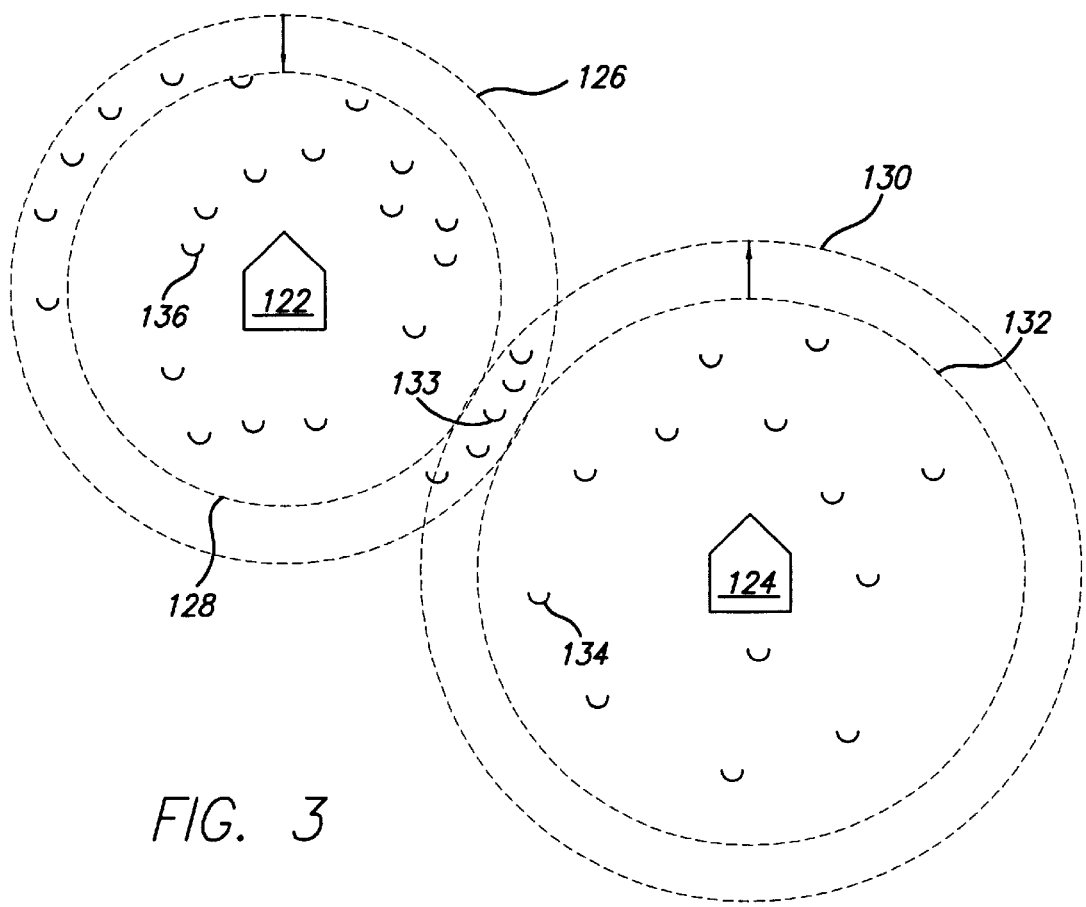
FIG. 3 is an illustration of using an ultra-wideband communication system in accordance with the present invention to adjust cell size.

Referring now to FIG. 3, a particular use of an ultra-wideband communication system 120 is described. Communication system 120 includes fixed transmitter 122 and fixed transmitter 124. Fixed transmitter 122 has an original cell size 126 indicated by a generally circular line on FIG. 3, while fixed transmitter 124 has an original cell size 132. Mobile users such as users 133, 134, and 136 are scattered within cells 126 and 132. Control circuitry at one or both of the fixed transceivers 122 and 124 monitor the bandwidth being utilized in each cell. Depending upon bandwidth utilization, the cell size can be adjusted to include more users in a cell or exclude users from a cell. For example, if fixed transceiver 122 is monitored and found to be nearing its bandwidth capacity, fixed transceiver 122 can be instructed to transmit at a lower power, thereby effectively reducing the original cell 126 to a reduced cell size 128. Since new cell size 128 is smaller, it contains fewer users which will thereby reduce the amount of bandwidth used at fixed transceiver 122. However, in transitioning from original cell size 126 to new cell size 128, certain users were abandoned from fixed transceiver 122, such as abandoned user 133. Accordingly, as fixed transceiver 122 is reducing its transmitted power levels, adjacent fixed transceiver 124 would be instructed to increase its power level transmissions to include the abandoned users such as abandoned user 133. In such a manner, original cell size 132 is expanded to new cell size 130. By increasing the number of users in cell 130, the bandwidth utilization by fixed transceiver 124 is increased. By dynamically monitoring the bandwidth of adjacent cells, and dynamically adjusting the power level transmitted from the fixed transceivers, bandwidth usage can be leveled across a communication system 120, resulting in greater overall system bandwidth.

In a particular example of the present invention, an adaptive power regulation method is provided to enable robust and reliable ultra-wideband communications. Generally, the adaptive power regulation method determines the attenuation caused by the transmission path and adjusts the power level of the transmission adaptively based on this attenuation. The adaptive power regulation method is more fully described below.

In the adaptive power regulation method, a key sequence synchronizes transmitter and receiver and allows the receiver to sense the attenuation suffered by the transmission. This key sequence can encompass one or more ultra-wideband (UWB) pulses. If the key sequence contains only one pulse, then it must be of fixed amplitude, and the receivers must know this value. If a sequence of pulses is used, the transmit power level is encoded in the sequence. The encoding of this information is made totally independent of the amplitude of the individual pulses and is preferably implemented by using a digital representation of the predefined power levels.

It is preferable to have a multitude of predefined power levels. Optimally the number of predefined power levels should be greater than 16, with 64 levels being a suitable discretization. The levels need not fall in a linear sequence, and a sequence that is not linear is better suited to this application. Level 1 is defined as the least attainable power and level 64 is the highest attainable power. Once a receiver measures the power of and decodes the key sequence, it can calculate the attenuation produced by the path between transmitter and receiver. The receiver can then respond to the key sequence by boosting its output to a level that overcomes the attenuation.

Figure 4:
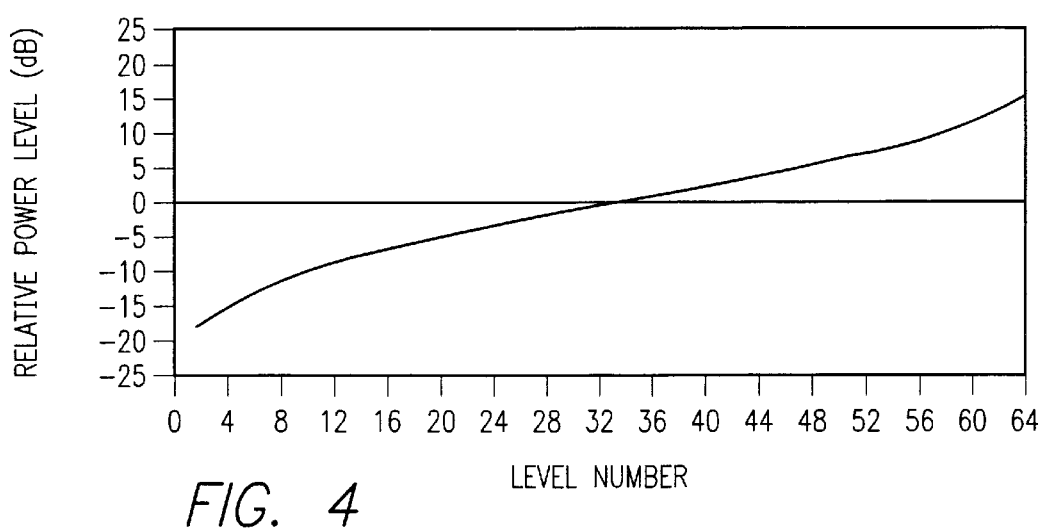
FIG. 4 is an illustration of example of discrete non-linear power levels for transmission power in accordance with the present invention.

The system is constrained by the need to initially limit the transmitted power of the key sequence in order to avoid interfering with other devices. For this reason, the initial power level before the first communication is established should be around 32 (in the middle of the range). FIG. 4 shows a suitable discretized power curve. It can be seen that the curve is designed to overcome inverse square attenuation (or inverse quartic attenuation if designed for indoor environments) in its middle region. It is also designed to rapidly scale up the power if, after several level increases, no intelligible reply has been obtained. It is expected that in most circumstances, the receiver will have to boost its output several levels to overcome attenuation, but will remain in the middle range. Inversely, if the initial power is much too high (a Bit Error Rate (BER) much lower than a predefined threshold), then the receiver can jump down to the rapidly decreasing bottom levels. As a communication session progresses, the BER and the received power are continuously monitored and the power level is adjusted to maintain low BER or reacquire the signal if it is lost.

Some communication sessions are less sensitive to BER than others (e.g., video is less sensitive than numeric data). This approach takes advantage of this variable sensitivity and adjusts the BER threshold based on the data type being transferred.

In this approach, both the receiver and the transmitter store the last power level used at the close of a communication session. This power level is then used as the first approximation for the power level of the next communication session between that particular pair. If no communication has occurred for a predefined amount of time, then power level 32 is used instead of the last power level used.

In an environment with multiple transmitter towers, this approach keeps the top few power levels available to the tower on reserve. These high power levels can be used to overcome mobile obstacles that produce temporary deep fading of the signal. They can also be used to allow for adaptive adjustment of the area serviced by the tower. This use of the top power levels allows an overburdened tower to hand-off some of its mobile users to neighboring towers by stepping back on its power output while the adjacent towers tap into their reserved power levels.

Figure 5:
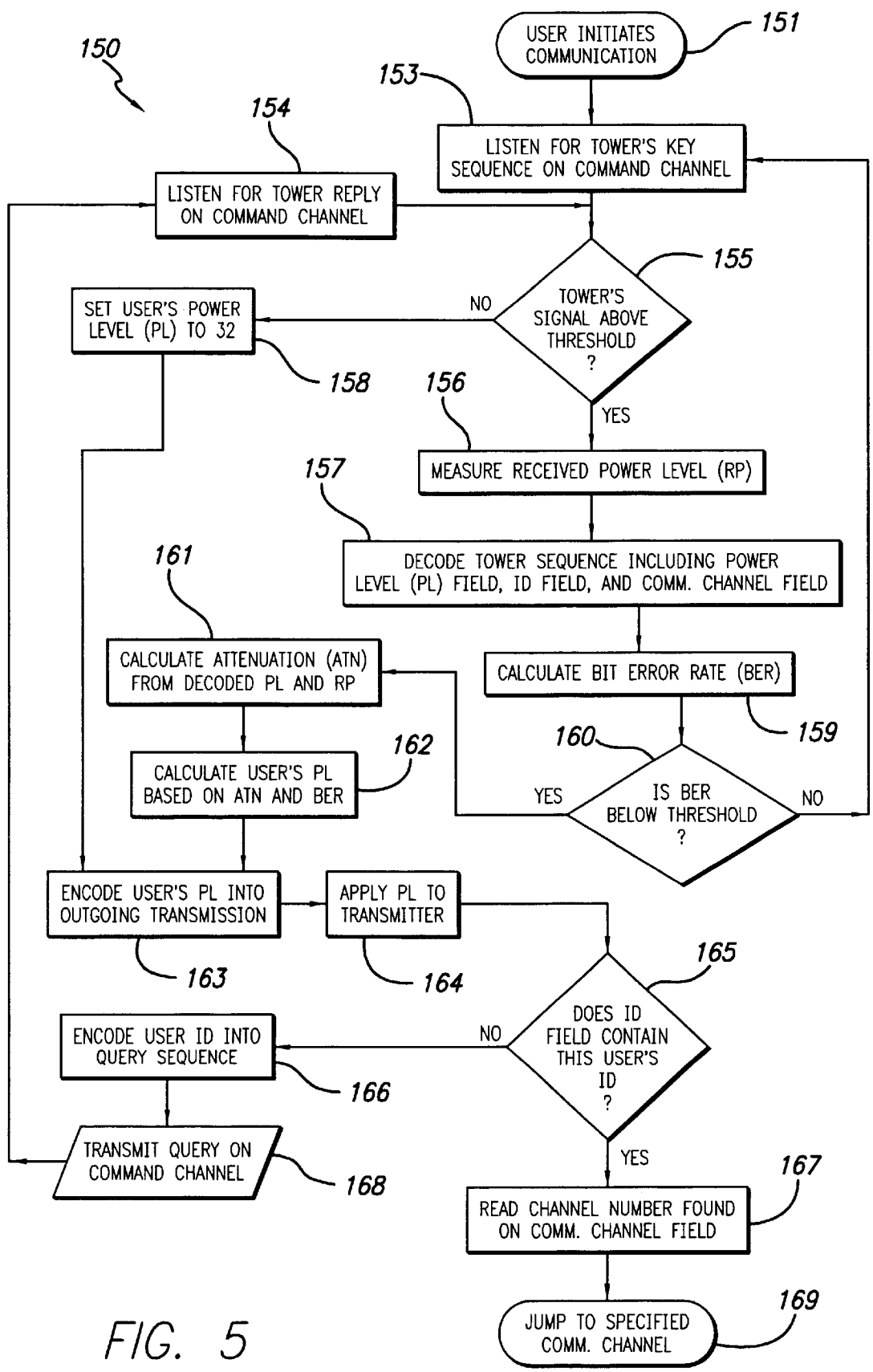
FIG. 5 is a flowchart of an adaptive power regulation method in accordance with the present invention.

Referring now to FIG. 5, a method 150 of adapting transmission power level for an ultra-wideband communication system is shown. In method 150, a communication is initiated by user in block 151, for example, by powering up a wireless device. The wireless device monitors a command channel of a transmitting cell transmitter as shown in block 153, and in particular, monitors for the key sequence. A received signal from the transmitting cell is compared to a threshold level in block 155, and if the received signal is above the threshold, the strength of the received signal is measure in block 156. It the received signal does not meet the minimum threshold, then a default value for the power level is selected, as shown in block 158.

Since the signal transmitted from the cell transmitter has an encoded power level, the encoded power level, and other information, is decoded from the received signal in block 157. Using known techniques, a bit-error-rate (BER) is calculated for the received transmission in block 159. The BER is compared to a threshold in block 160. If the BER is too high, the system loops back to block 153 to again sample the transmitter signal. If the BER is acceptable, then, in block 161, the measured signal strength is compared to the power level decoded from the received signal, and an attenuation factor is calculated. Using the attenuation factor, a power level 162 is selected for the next transmission.

The selected power level is encoded in the data for the outgoing transmission, as shown in block 163, and the selected power level is set on the transmitter in block 164. Blocks 165–169 illustrate the selection of the channel that will receive the next data stream. If a communication channel has already been selected, then the transmission is made on that selected channel, as shown in block 169, or if no channel is yet allocated, a query transmission is made on the command channel, as shown in block 168. Either way, the transmission is made at the power indicated in block 164.

Figure 6:
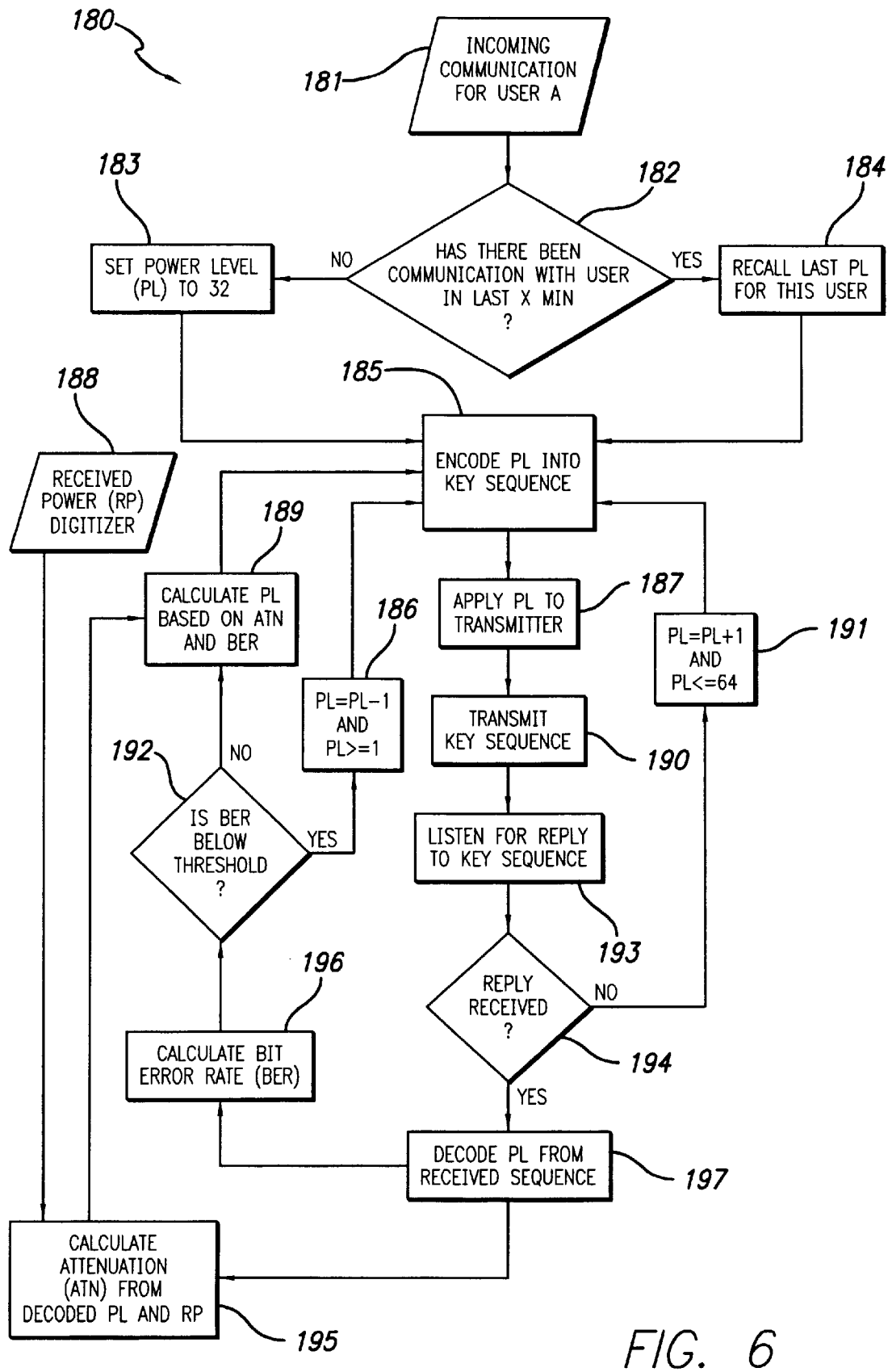
FIG. 6 is a flowchart of another adaptive power regulation method in accordance with the present invention.

Referring now to FIG. 6, a method 180 of adapting transmission power level for an ultra-wideband communication system is shown. In method 180, the last successful transmission power level from a particular device is used to more effectively set the power level for the next transmission. As shown in block 181, a particular user or device receives an incoming communication or desires to send an outgoing message. The time since last transmission is queried in block 182 and compared to a time threshold. The time threshold may be set, for example to 1 minute. It will be appreciated that an appropriate threshold may be set for different applications and environments.

If a transmission has been made within the threshold, the last successful transmission power level is recalled in block 184. If the last transmission is outside the time threshold, then the power level is set to a default level as shown in block 183. The selected power level is encoded into data to be transmitted in block 185, and the data transmitted at the selected power level in blocks 187 and 190. A reply to the transmission is expected in block 193 and 194. If no response is received, then the power level is incremented by one level, up to the maximum level, as shown in block 191. If a reply is received, then the power level data from the received signal is decoded in block 197.

An attenuation factor and BER are calculated as described above in blocks 195 and 196, respectively. If the BER is below a minimum threshold level 192 then, in block 186, the power level for the next transmission is decremented one level, if possible. Accordingly, the method 180 is tuning the transmission power level to the lowest acceptable level. If the BER is above the threshold, then block 189 uses the attenuation factor and the BER to determine a new power level for the next transmission. For example, if the attenuation factor is relatively high, but the BER is only slightly over the BER threshold, then the power level may have to be increased only slightly. Since the BER is dependent not only on signal quality, but also signal content, the method 180 is able to set the lowest acceptable power level to match transmission conditions and signal data content.

One skilled in the art will appreciate that the present invention can be practiced by other than the preferred embodiments which are presented in this description for purposes of illustration and not of limitation, and the present invention is limited only by the claims which follow. It is noted that equivalents for the particular embodiments discussed in this description may practice the invention as well.

What is claimed is:

1. A method for setting a power level for an ultra-wideband communication signal, comprising:

setting an initial power level for a first ultra-wideband signal;

encoding on the first ultra-wideband signal information indicative of the initial power level;

receiving the first ultra-wideband signal at a receiver;

measuring the strength of the received first ultra-wideband signal;

decoding at the receiver the information indicative of the initial power level;

generating an attenuation factor using the decoded information and the measured strength;

determining a new power level responsive to the attenuation factor; and setting the new power level for a second ultra-wideband signal; and encoding on the second ultra-wideband signal information indicative of the new power level.

2. The method according to claim 1 further including the steps of:

receiving at a receiver ultra-wideband signals from a plurality of transmitters;

determining a geographic position for the receiver using the plurality of ultra-wideband signals;

extracting transmitter position information from a selected one of received ultra-wideband signals;

comparing the geographic position of the receiver to the selected transmitter position information;

determining an actual distance between the receiver and the selected transmitter; and adjusting the new power level responsive to the actual distance.

3. The method according to claim 1 where the encoding step includes converting the initial power level to a digital value and transmitting the digital value to the receiver.

4. The method according to claim 1 where the encoding step includes embedding the indicative of the initial power level in a data packet, where the data packet is transmitted to the receiver.

5. The method according to claim 1 wherein the measuring step includes detecting a peak voltage level of the received first ultra-wideband signal.

6. An ultra-wideband transceiver, comprising:

a transmit circuit for transmitting a first ultra-wideband signal to a receiver, the transmit circuit configured to transmit the first ultra-wideband signal at a selectable power level;

an encoding circuit for embedding a first power value in the first ultra-wideband signal, the power value being indicative of the selected power level;

a receiving circuit configured to receive a second ultra-wideband signal, the second ultra-wideband signal having a second embedded power value;

a measuring circuit generating a measured value indicative of the strength of the second ultra-wideband signal;

a computational circuit generating an attenuation factor responsive to comparing the measured value to the second power value;

a feedback circuit that uses the attenuation factor to select a new power level that the transmit circuit will transmit a next ultra-wideband signal, the new power level being embedded in the next ultra-wideband signal.

7. The transceiver according to claim 6, further comprising:

a positioning circuit for generating geographical position data indicative of the actual position of the transceiver;

a distance circuit configured to receive position data indicative of the position of a remote transmitter, and to determine the actual distance from the actual position of the transceiver to the remote transmitter; and wherein the feedback circuit is configured to receive data indicative of the actual distance and adjust the new power in response to the actual distance.

8. An ultra-wideband communication system, comprising:

a first fixed ultra-wideband transceiver having a first cell size, the first transceiver having a first bandwidth;

a second fixed ultra-wideband transceiver adjacent to the first ultra-wideband transceiver having a second cell size, the second transceiver having a second bandwidth;

a controller implementing the steps of monitoring the bandwidth used by the first fixed ultra-wideband transceiver;

reducing the first cell size responsive to the bandwidth exceeding an acceptable usage level, a portion of the first cell being abandoned to reduce bandwidth usage by the first cell; and communicating to the second fixed ultra-wideband transceiver a signal to cause the second cell size to be increased to include at least a portion of the abandoned area, the bandwidth usage of the second cell being increased.

9. The system according to claim 8, wherein reducing the first cell size includes instructing the first fixed ultra-wideband transceiver to transmit at a low power level.

10. The system according to claim 9, wherein a signal transmitted by the first ultra-wideband transceiver includes data indicative of the low power level.

* * * * *